(12) United States Patent
Usmani

(10) Patent No.: US 8,842,696 B1
(45) Date of Patent: Sep. 23, 2014

(54) GUARANTEED RATE PORT SCHEDULER

(75) Inventor: Ozair Usmani, San Jose, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 407 days.

(21) Appl. No.: 13/165,479

(22) Filed: Jun. 21, 2011

(51) Int. Cl.
*H04J 3/24* (2006.01)
*H04J 1/00* (2006.01)
*G06F 13/00* (2006.01)

(52) U.S. Cl.
USPC ............................ 370/474; 370/489; 710/107

(58) Field of Classification Search
USPC ................................................. 370/474, 489
See application file for complete search history.

(56) References Cited

U.S. PATENT DOCUMENTS

2008/0040757 A1* 2/2008 Romano et al. .................. 725/81

* cited by examiner

*Primary Examiner* — Afshawn Towfighi
(74) *Attorney, Agent, or Firm* — Sterne, Kessler, Goldstein & Fox, P.L.L.C.

(57) ABSTRACT

A guaranteed rate port scheduler (GRPS) is used for serving multiple destination ports simultaneously without under-runs, even if the total bandwidth of the ports is more than the bandwidth capability of the device. Certain network protocols, such as Ethernet, do not allow "gaps" (called under-runs) to occur between bits of a packet on the wire. If a network device is transmitting packets to several such ports at the same time and the combined bandwidth of these ports is more than the device can source, under-runs begin to occur within the transmitted packets. The disclosed GRPS solves this problem by: (a) the GRPS serves only as many destination ports at a given time as can be "handled", and (b) the GRPS fairly selects new destination ports to serve after every end-of-frame data packet transmission by effectively "derating" the statistical bandwidth of each destination port in proportion to the diminished capacity of the device.

19 Claims, 9 Drawing Sheets

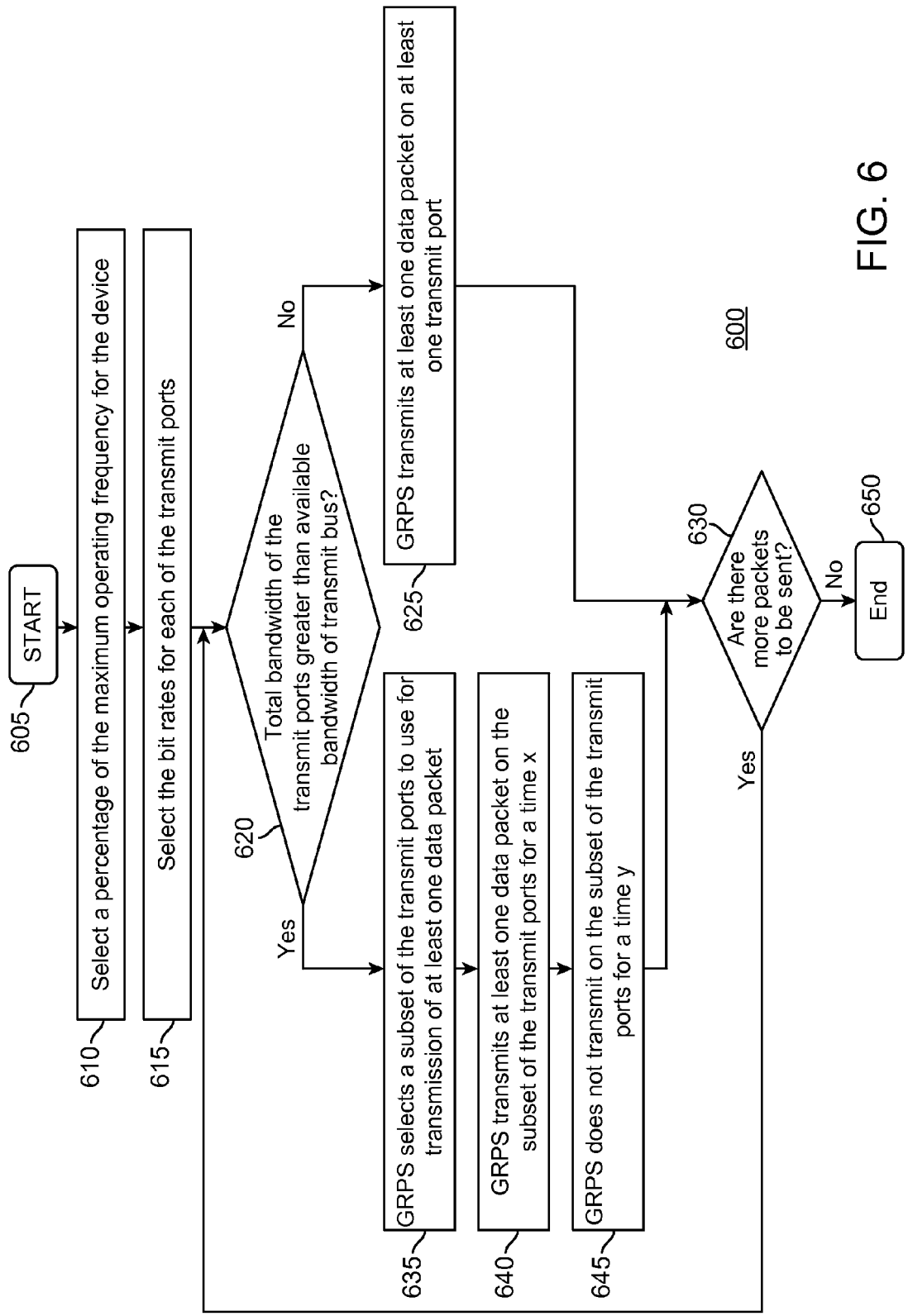

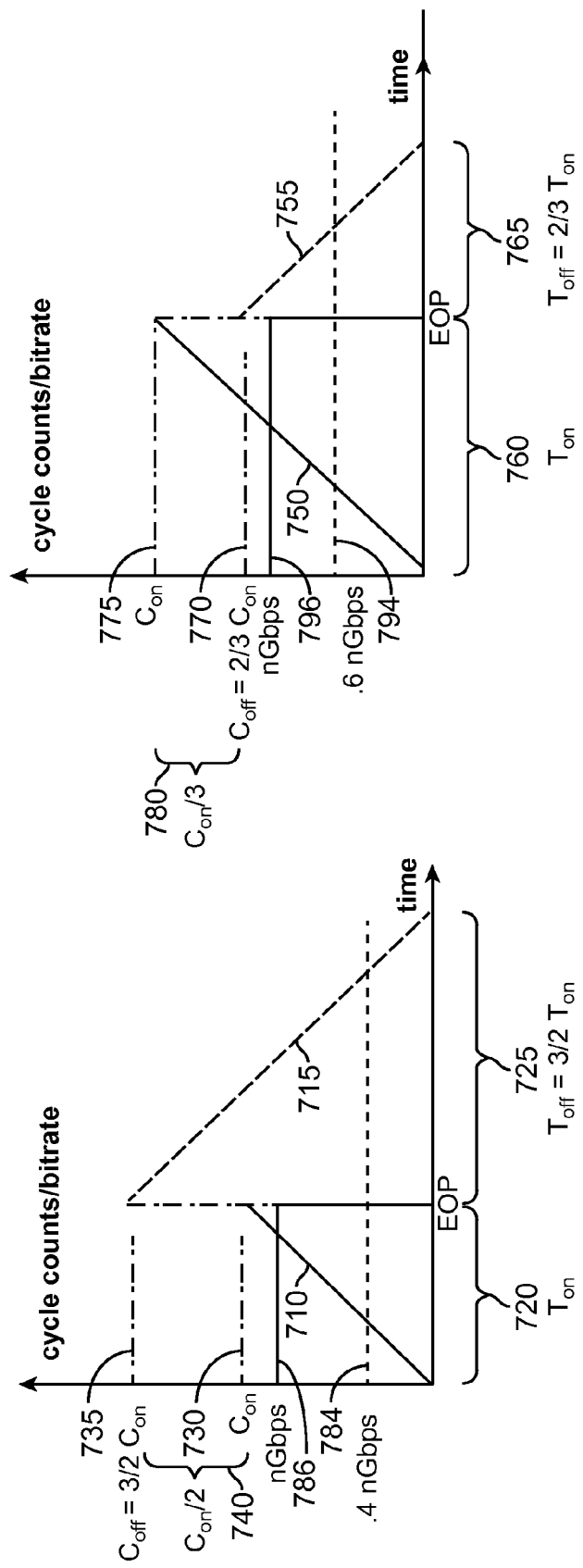

GUARANTEED RATE PORT SCHEDULER

FIELD

The present disclosure relates to port schedulers. In particular, it relates to guaranteed rate port schedulers.

BACKGROUND

Certain network protocols, such as Ethernet, do not allow for "gaps" (called under-runs) to occur between bits of a data packet on the wire. If a network device is transmitting data packets to several such destination ports at the same time and the combined bandwidth of these destination ports is more than the device can source, under-runs will occur within the transmitted data packets. As such, there is a need for a means to eliminate under-runs from occurring during this type of situation.

SUMMARY

Systems, apparatuses, and methods are disclosed for a guaranteed rate port scheduler (GRPS). The disclosed GRPS is used for serving multiple destination ports (also referred to as transmit ports) simultaneously without under-runs, even if the total bandwidth of the destination ports is more than the bandwidth capability of the device. In some embodiments, the disclosed GRPS is able to eliminate the problem of under-runs occurring when the combined bandwidth of the destination ports is more than the device can source by performing a two-stage solution. The two-stage solution is: (a) the GRPS serves only as many destination ports at a given time as can be "handled", and (b) the GRPS fairly selects new destination ports to serve after every end-of-frame data packet transmission by effectively "de-rating" the statistical bandwidth of each destination port in proportion to the diminished capacity of the device.

For example, a method for operation of the GRPS involves selecting, by a user, a percentage of the maximum operating frequency for a device. This selection will effectively "de-rate" the statistical bandwidth of the transmit ports. In one or more embodiments, the percentage of the maximum operating frequency is selected by the user by specifying a frequency for operation of the device. In at least one embodiment, the device is a processor chip. The method also involves selecting, by the user, bit rates for each of the transmit ports.

In addition, in some embodiments, the method involves comparing, by the GRPS, total bandwidth for a plurality of transmit ports to available bandwidth of a transmit bus. The transmit bus is connected to the transmit ports and to the GRPS. If the total bandwidth for the transmit ports is greater than the available bandwidth of the transmit bus, the method involves selecting, by the GRPS, a subset of the transmit ports to use for transmission of at least one data packet. In one or more embodiments, the subset of the transmit ports consists of one or more of the transmit ports.

Further, in some embodiments the method involves transmitting, by the GRPS, the data packet(s) on the subset of the transmit ports for a time x, where time x is equal to the time it takes to transmit the data packet(s). After the data packet(s) have been transmitted, the method further involves not transmitting, by the GRPS, on the subset of the transmit ports for a time y, where time y is a function of time x and the percentage of the maximum operating frequency. In one or more embodiments, time y is equal to (time x/(the percentage of the maximum operating frequency/100)) times (1−(the percentage of the maximum operating frequency/100)).

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

Figure 5B:
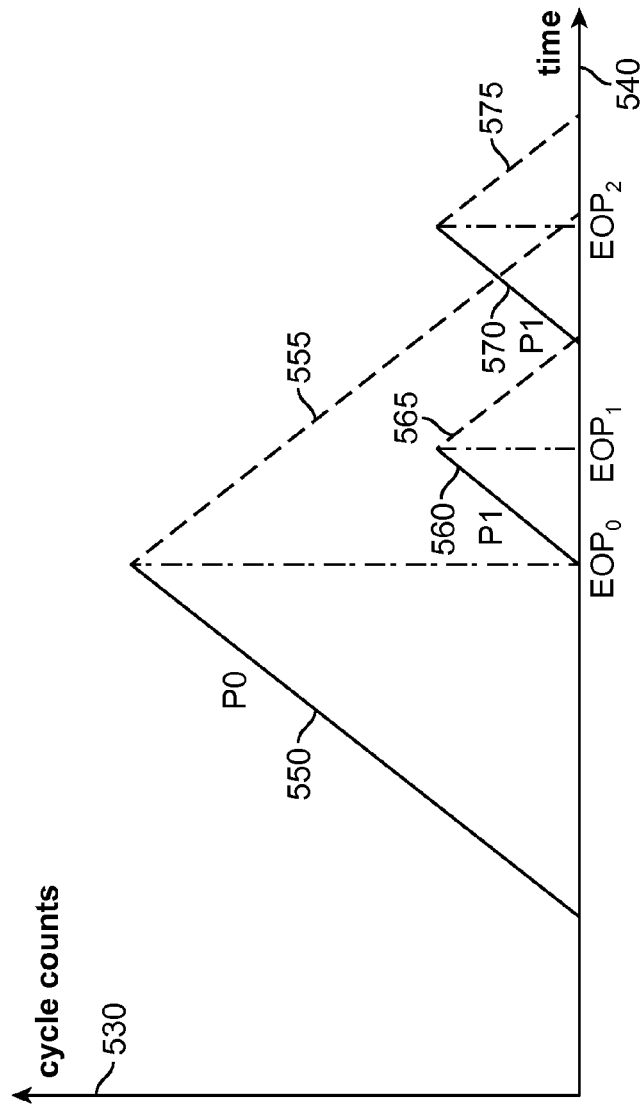
Figure 5A:
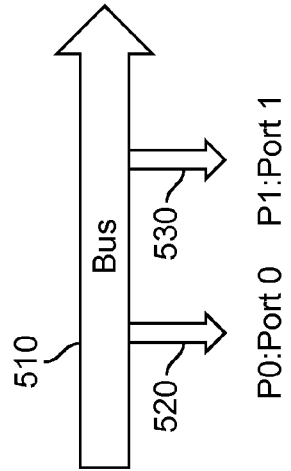

FIGS. 5A and 5B, when viewed together, provide a simple example illustrating the operation of the disclosed GRPS, in accordance with at least one embodiment of the present disclosure.

FIG. 5A shows an exemplary transmit bus connected to two transmit ports, in accordance with at least one embodiment of the present disclosure.

FIG. 5B shows a graph depicting the transmission of three data packets on the two transmit ports of FIG. 5A over time where the bandwidth of each of the two transmit ports is de-rated to a 50% capacity, in accordance with at least one embodiment of the present disclosure.

FIG. 6 shows a flow chart of the operation of the GRPS as depicted in the example of FIGS. 5A and 5B, in accordance with at least one embodiment of the present disclosure.

FIGS. 7A and 7B show additional examples illustrating the operation of the disclosed GRPS, in accordance with at least one embodiment of the present disclosure.

FIG. 7A shows a graph depicting the transmission of a data packet over time where the bandwidth of the transmit port for the data packet is de-rated to a 40% capacity, in accordance with at least one embodiment of the present disclosure.

FIG. 7B shows a graph depicting the transmission of a data packet over time where the bandwidth of the transmit port for the data packet is de-rated to a 60% capacity, in accordance with at least one embodiment of the present disclosure.

Figure 8A:
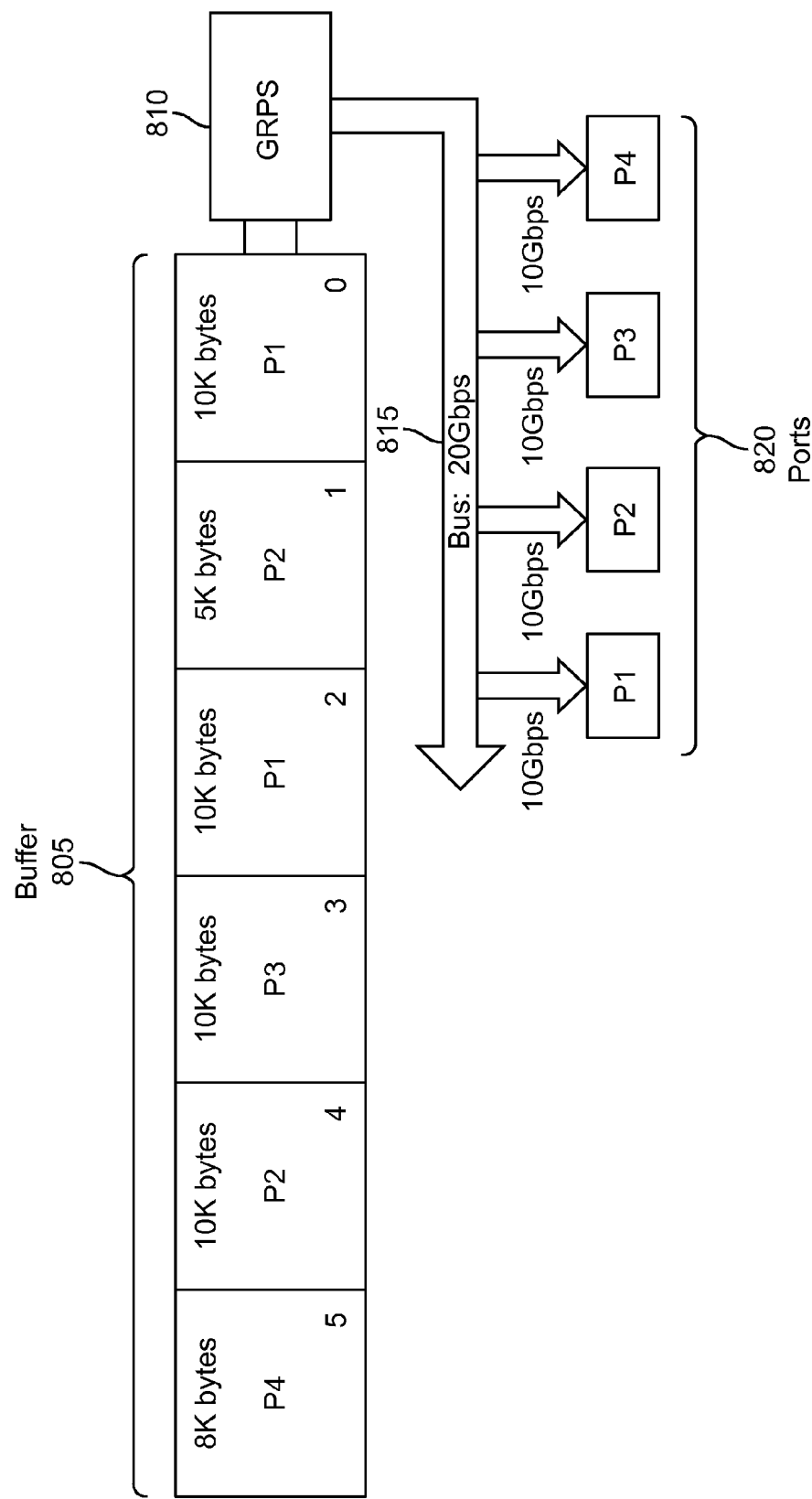
Figure 8B:
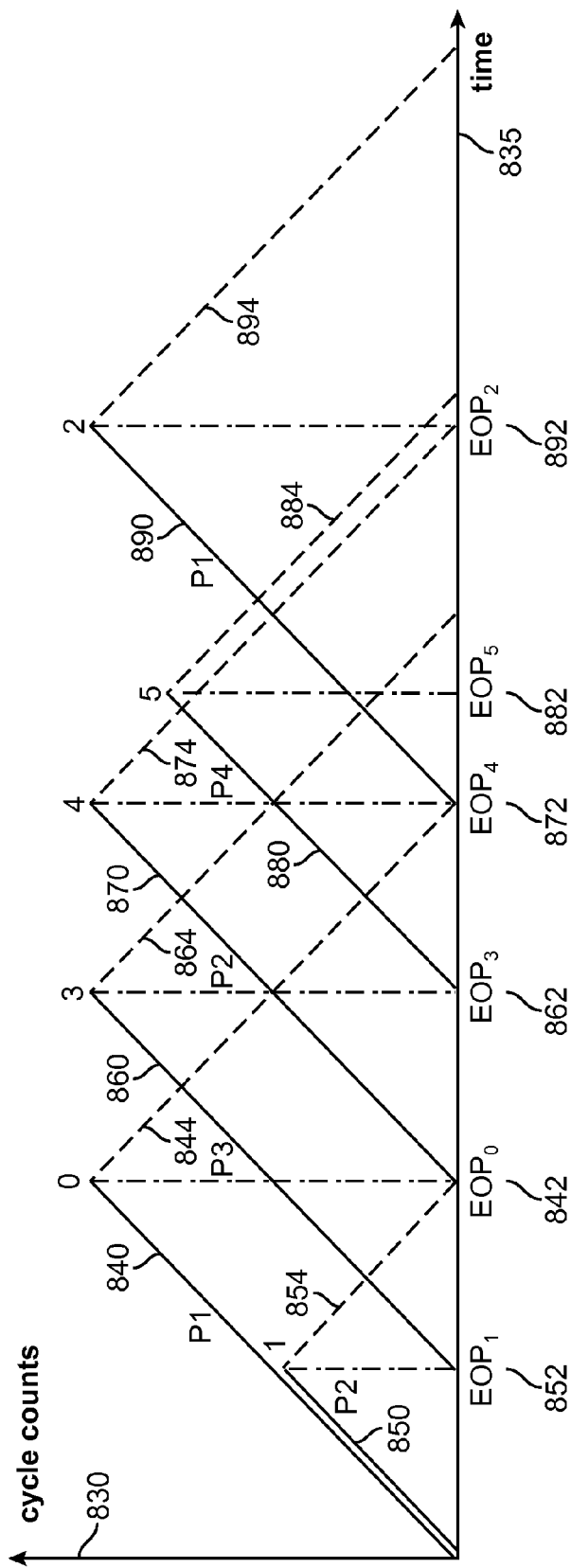

FIGS. 8A and 8B, when viewed together, provide a detailed example illustrating the operation of the disclosed GRPS, in accordance with at least one embodiment of the present disclosure.

FIG. 8A shows an example simplified diagram of the disclosed GRPS scheduling data packets from a buffer to transmit ports, in accordance with at least one embodiment of the present disclosure.

FIG. 8B shows a graph depicting the transmission of the data packets on the transmit ports of FIG. 8A over time where the bandwidth of each of the transmit ports is de-rated to a 50% capacity, in accordance with at least one embodiment of the present disclosure.

DESCRIPTION

Some embodiments of the present disclosure will now be described in detail with respect to the drawings, which are provided as illustrative examples. Notably, the figures and examples below are not meant to limit the scope of the disclosure to a single embodiment, but other embodiments are possible by way of interchange of some or all of the described or illustrated embodiments. Whenever convenient, the same reference numbers will be used throughout the drawings to refer to the same or like parts. Where certain elements of the embodiments can be partially or fully implemented using known components, only those portions of known components that are necessary for understanding of the embodiment will be described, and detailed descriptions of other portions of such known components will be omitted so as to not obscure the description. In the present specification, an embodiment showing a singular component should not be considered to be limiting; rather, other embodiments may include a plurality of the same components, and vice versa, unless explicitly stated otherwise. Moreover, applicants do not intend for any term in the specification or claims to be ascribed an uncommon or special meaning unless explicitly set forth as such. Further, embodiments encompass present and future known equivalents to the components referred to by way of illustration.

A guaranteed rate port scheduler (GRPS) is disclosed which is used for serving multiple destination ports simultaneously without under-runs, even if the total bandwidth of the destination ports is more than the bandwidth capability of the device. In some embodiments, the disclosed GRPS prevents under-runs from occurring by: (a) the GRPS serves only as many destination ports at a given time as can be handled, and (b) the GRPS fairly selects new destination ports to serve after every end-of-frame data packet transmission by effectively de-rating the statistical bandwidth of each destination port in proportion to the diminished capacity of the device.

Figure 1:
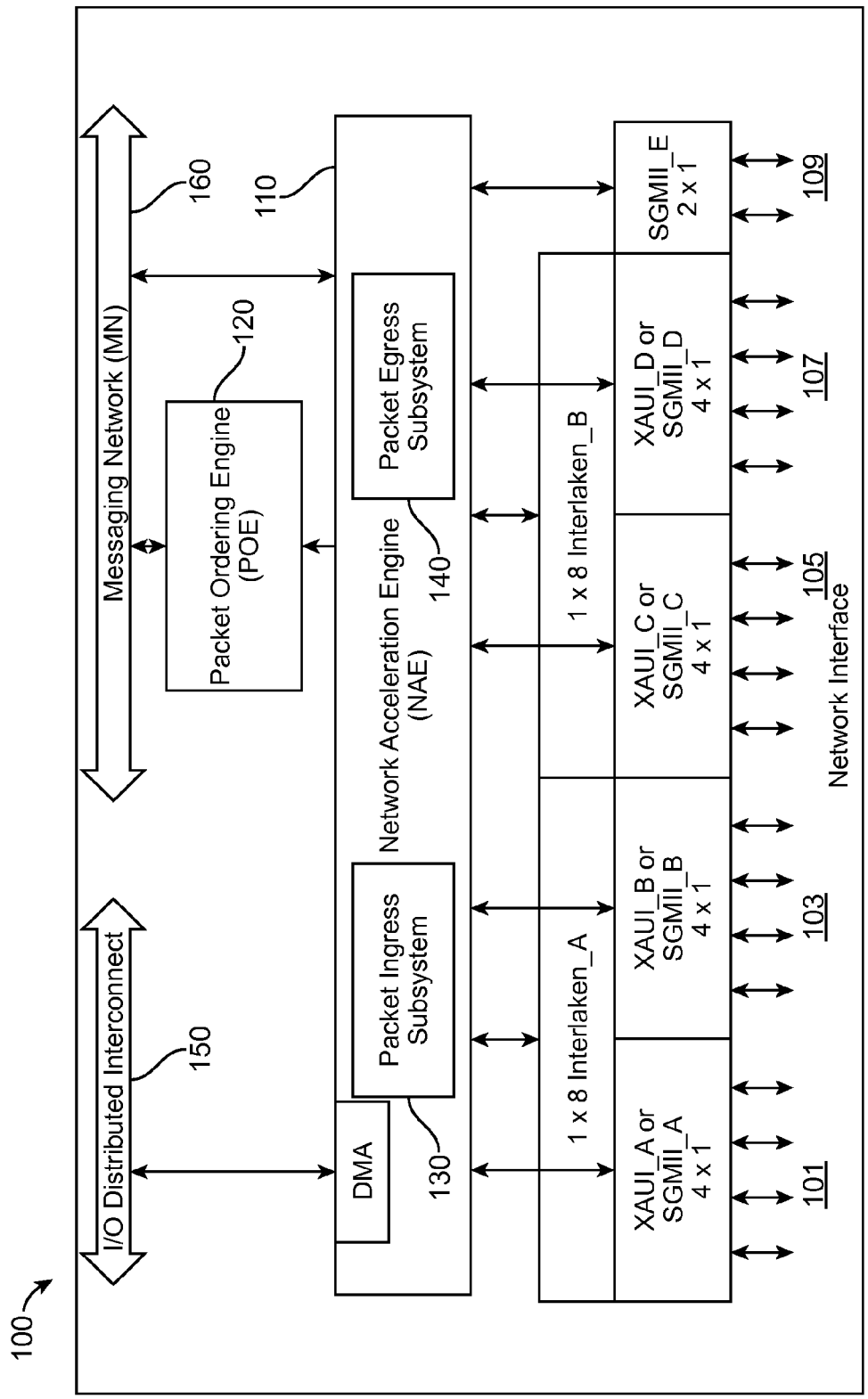
FIG. 1 is a diagram illustrating an exemplary system that employs the disclosed guaranteed rate port scheduler (GRPS), in accordance with at least one embodiment of the present disclosure.

FIG. 1 is a diagram illustrating an exemplary system 100 that employs a GRPS, in accordance with at least one embodiment of the present disclosure. In particular, this figure shows a network acceleration engine (NAE) 110 along with other related blocks. In this figure, all networking interfaces 101, 103, 105, 107, 109 are shown to be connected to the centralized NAE 110 for data packet parsing and classification. For this particular exemplary system 100, the NAE 110 is capable of handling an aggregate of 40 Gigabits per second (Gbps) of ingress traffic and 40 Gbps of egress traffic for data packets with sizes of 64 bytes or more.

A packet ordering engine (POE) 120 is responsible for ensuring that data packet fragments belonging to a specific flow are transmitted by the NAE Packet Egress Subsystem (NAE Tx) 140 in the same order in which they were received by the NAE Packet Ingress Subsystem (NAE Rx) 130. The main functions of the NAE Packet Ingress Subsystem 130 are to perform parsing and classification of incoming data packets before passing control to the POE 120. The NAE Packet Ingress Subsystem 130 performs these functions using a dedicated hardware parser and a plurality of programmable micro-core processors. Other features of the NAE Packet Ingress Subsystem 130 include, but are not limited to, hardware-assisted protocol/transmission control protocol/user datagram protocol (IP/TCP/UDP) checksum validation, IEEE 1588v2 protocol timestamp support, pre-padding bytes (e.g., 64 bytes) to the received data packet for storing a classification key (e.g., 40-bytes in size) and timestamp, and class-based flow control to support selective lossless network connectivity.

In addition, the system 100 employs free descriptor queues that are divided into a number of descriptor pools (e.g., twenty (20) pools). Descriptors are message units of specially formatted words that are, for example, 64-bits in length. For the NAE 110, each descriptor points to a pre-allocated data buffer in memory where packet data will be stored. Software uses free-in messages to initialize the descriptors in the pools. The micro-core processors in the NAE Packet Ingress Subsystem 130 determine which descriptor pool to draw descriptors from for each data packet, thereby determining where each data packet will be written in memory.

The NAE Packet Egress Subsystem 140, as its name implies, is responsible for transmitting the data packets via the interfaces 101-109. Other functions of the NAE Packet Egress Subsystem 140 include, but are not limited to, IP/TCP/UDP checksum generation and insertion, data packet assembly, TCP segmentation offloading (TSO) by use of an incorporated TSO engine, priority/deficit round robin-based packet scheduling for egress to the network interface, and time-stamping the transmitted data packet for IEEE 1588v2 protocol support.

Figure 2:
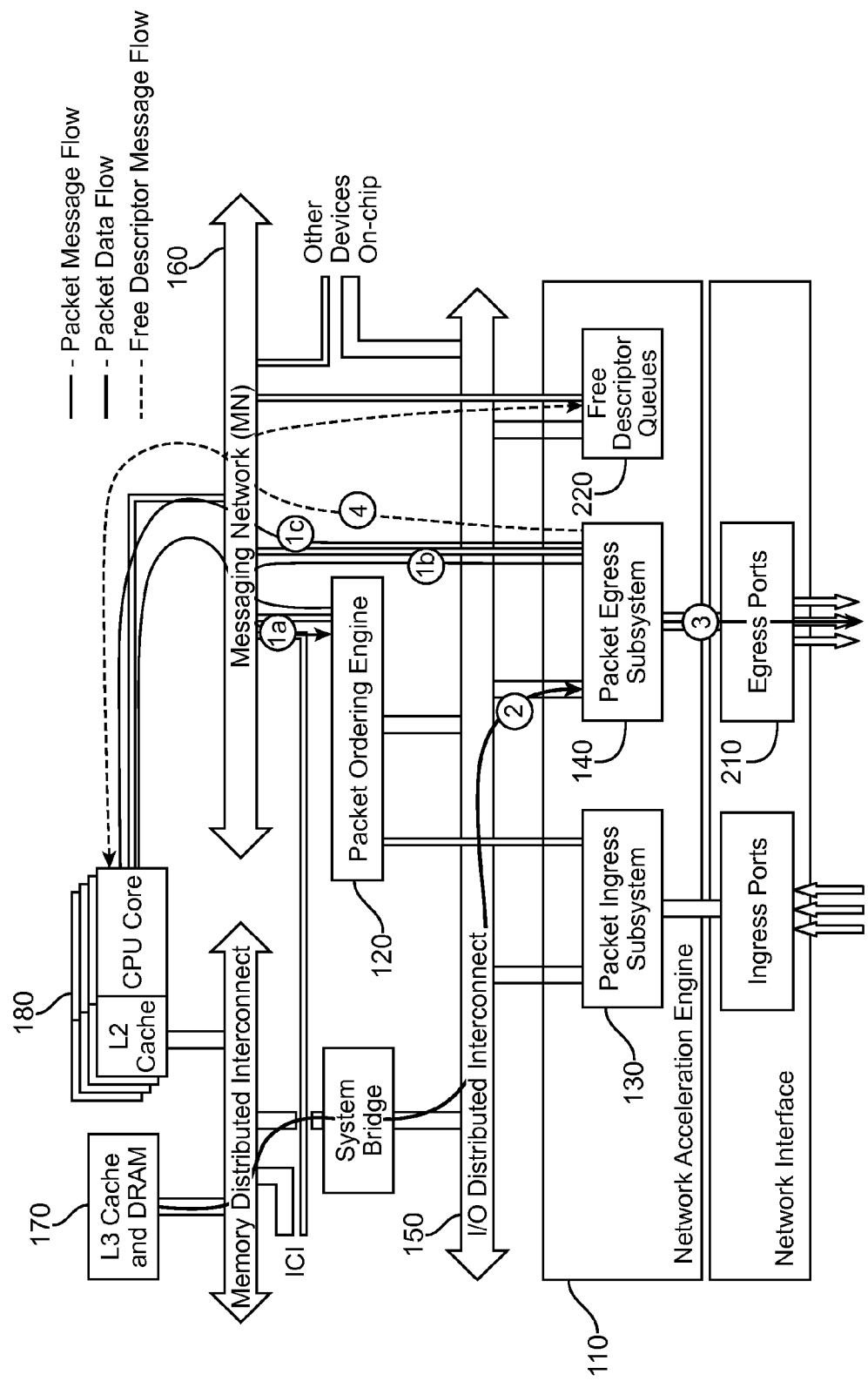
FIG. 2 is a diagram illustrating the egress flow of a data packet through the exemplary system of FIG. 1, in accordance with at least one embodiment of the present disclosure.

FIG. 2 is a diagram illustrating the egress flow of a data packet through the exemplary system 100 of FIG. 1, in accordance with at least one embodiment of the present disclosure. During normal processing, when packet descriptors are accompanied by POE descriptors, a processor thread, either real or virtual, in a central processing unit (CPU) core sends the packet descriptors back to the POE 120 (denoted by message flow 1a in FIG. 2). If the data packet is for transmission, the POE 120 will forward the packet descriptors to the NAE Packet Egress Subsystem 140 (denoted by message flow 1b in FIG. 2) in the same order they were received in the NAE Packet Ingress Subsystem 130. If no POE descriptor is associated with the packet descriptors, the processor thread sends the packet descriptors directly to the NAE 110 (denoted by message flow 1c in FIG. 2).

Then, the NAE 110 reads the data from packet buffers in a L3 cache/DRAM 170 that is pointed to by the packet descriptors (denoted by message flow 2 in FIG. 2), and optionally calculates an IP/TCP/UDP checksum and/or a stream control transmission protocol (SCTP) checksum for the data. In addition, the NAE Packet Egress Subsystem 140 performs TCP segmentation offload (TSO) in hardware. The NAE Packet Egress Subsystem 140 transmits the packet data to the Network Interface Egress Ports 210 for final transmission (denoted by message flow 3 in FIG. 2). Optionally, the data packet is time stamped for IEEE 1588v2 protocol support.

The Packet Egress Subsystem 140 frees up packet descriptors that are associated with data packets that have been transmitted to the free descriptor queues 220 (denoted by message flow 4 in FIG. 2). In addition, optionally, a notice regarding the free descriptors is sent to the processor thread in the CPU core 180. If the data packet transmission was initiated by the processor thread, packet descriptors can be freed up to the processor thread to free up the allocated memory.

Figure 3:
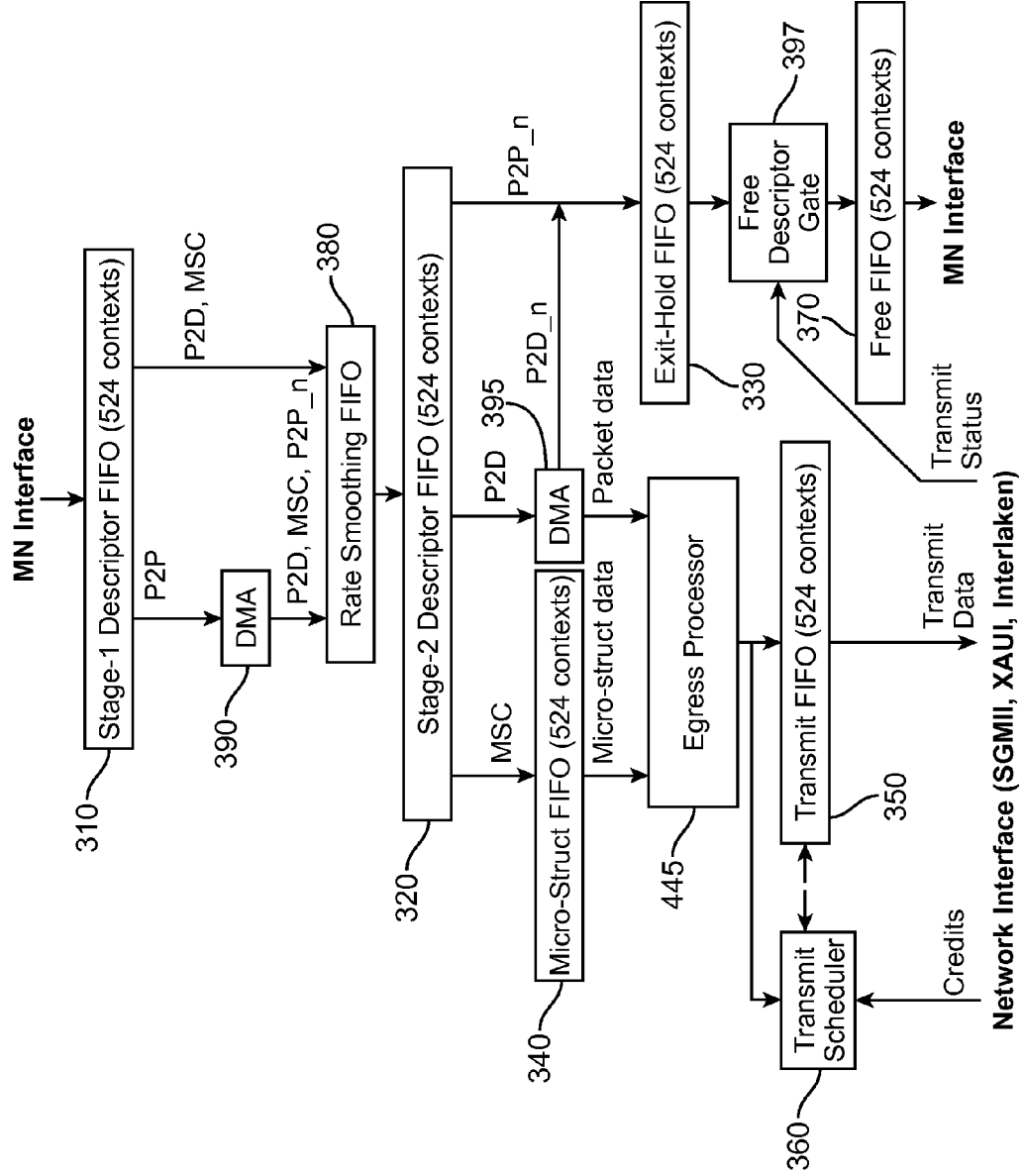
FIG. 3 is a functional block diagram of the egress path of the exemplary system of FIG. 1, in accordance with at least one embodiment of the present disclosure.

FIG. 3 is a functional block diagram 300 of the egress path of the exemplary system 100 of FIG. 1, in accordance with at least one embodiment of the present disclosure. The egress side of the NAE 110 receives packet descriptors that contain information about the data packets, processes the packet descriptors, and then reads the transmit data packets from memory according to the packet descriptors. Transmit (Tx) packet descriptors are broadly classified into three general types, which are (1.) a pointer-to-data descriptor (P2D), (2.) a pointer-to-list-of-pointers descriptor (P2P), and a micro struct control descriptor (MSC). A P2D descriptor points directly to packet data in memory, and a P2P descriptor contains a pointer to a list of P2D descriptors. An MSC descriptor is a command structure that instructs the Egress Processor 140 what operation to perform on the data packet that is associated with the next P2D descriptor. During normal operation, the POE 120 sends Tx packet descriptors to the NAE 110 using the messaging network (MN) (refer to 160 in FIGS. 1-2), although it should be noted that a processor thread could also generate a Tx data packet. These Tx packet descriptors are stored in a message queue area, which allows for up to a specific number of contexts (e.g., 524 contexts).

The egress path of FIG. 3 contains a number of first-in-first-out units (FIFOs) 310, 320, 330, 340, 350, 370, 380 with associated logic; direct memory access (DMA) 390, 395 lookup logic; and an Egress Processor 445. The egress path receives the Tx packet descriptors from a processor thread via the messaging network. Then, the descriptors are fed into the Stage-1 Descriptor FIFO 310, which acknowledges the message by returning a message credit to the messaging network. Logic in the output stage of the Stage-1 Descriptor FIFO 310 directs P2P descriptors to a DMA engine 390. The DMA engine 390 in turn retrieves from memory, via the I/O distributed interconnect (refer to 150 in FIGS. 1-2), the list of P2D descriptors and MSC descriptors that are pointed to by the P2P descriptor, and inserts these descriptors in the descriptor stream at the position of the P2P descriptor.

The Stage-2 Descriptor FIFO 320 directs the P2D descriptors to the DMA 395, which retrieves the associated packet data from memory and sends the packet data to the Egress Processor 445. The P2D and P2P descriptors are sent to the Exit Hold FIFO 330 where they will remain until the packet data has been transmitted out by the network interface. The output logic of the Stage-2 Descriptor FIFO 320 forwards MSC descriptors to the Micro-Struct FIFO 340. The Micro-Struct FIFO 340 holds the micro-struct, which contains up to two MSC descriptors, until the packet data associated with the packet descriptor following the MSC descriptor(s) is fed into the Egress Processor 445. The MSC descriptor(s) controls the operation to be performed on the data packet.

The processed data packet is then fed into a context-specific Transmit FIFO 350. The scheduling of the data packets to each transmit network interface is performed by, for example, a 9-level strict priority Transmit Scheduler 360, which is comprised of, for example, eight (8) strict-priority levels and one (1) deficit round-robin (DRR) level. In some embodiments, the Transmit Scheduler 360 also includes the GRPS. The GRPS obtains the data packets and schedules their transmission to the network interface ports (also referred to as transmit ports or destination ports) through the Transmit FIFO 350.

After a data packet has been transmitted from the network interface, the network interface returns the transmit status, including an IEEE 1588v2 protocol time stamp indicating when the packet was transmitted if requested by the software. Upon receiving the transmit status signal, the associated P2D and P2P descriptors are released from the Exit Hold FIFO 330 to the Free Descriptor Gate 397, and then to the Free FIFO 370.

The NAE Packet Egress Subsystem (NAE Tx) (refer to 140 on FIG. 1) contains a hardware-implemented TCP segmentation offload (TSO) engine. The TSO engine can break large transmission control protocol/internet protocol (TCP/IP) data packets, which for example are up to 65,535 bytes in size, into TCP segments that have payloads equal to or less than the maximum segment size (MSS). The MSS is the largest amount of payload data that can be encapsulated by a header of a TCP segment.

Figure 4:
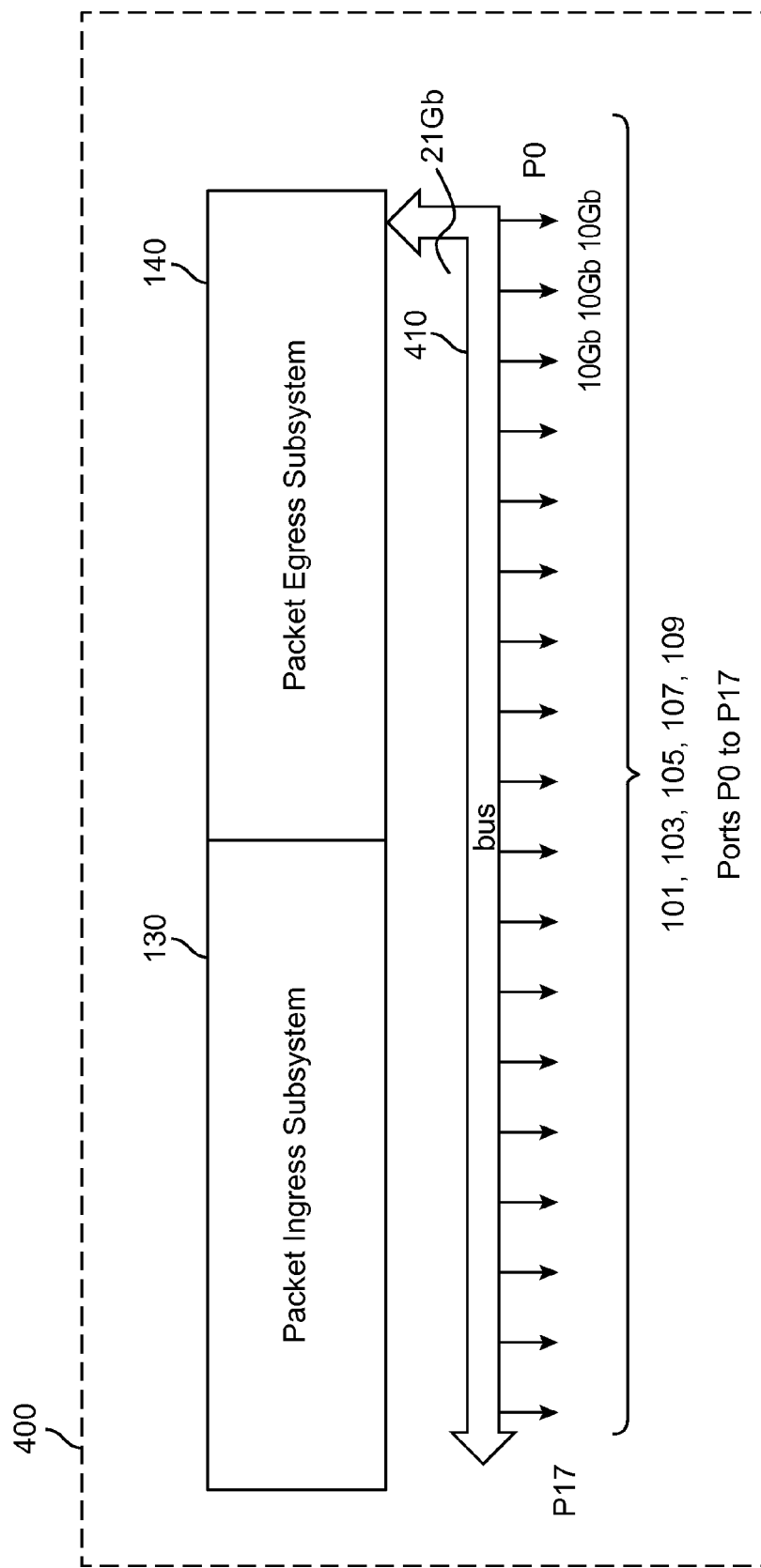
FIG. 4 is an example simplified diagram for the exemplary system of FIG. 1, in accordance with at least one embodiment of the present disclosure.

FIG. 4 is an example simplified diagram 400 for the exemplary system of FIG. 1, in accordance with at least one embodiment of the present disclosure. In particular, this figure shows the ingress subsystem 130 connected to the egress subsystem 140, and the egress subsystem 140 connected to an input/output (I/O) bus 410. Also in this figure, the network interface ports (P0-P17) 101, 103, 105, 107, 109 are shown to be connected to the I/O bus 410.

For this example, the three network interface ports P0, P1, and P2 are programmed by the user to operate at 10 Gbps each. The user has also programmed the system to operate at a lower frequency so as to reduce power consumption and thermal loading. As a result, in this example, the I/O bus 410 is operating at a reduced capacity of 21 Gbps. Since the total bandwidth (i.e. 10*18=180 Gbps) of the network interface ports (P0-P17) 101, 103, 105, 107, 109 is larger than the current operating capacity of the I/O bus 410 (i.e. 21 Gbps), all of the network interface ports (P0-P17) 101, 103, 105, 107, 109 cannot operate simultaneously at their full data rates. As such, the GRPS allocates the available I/O bus 410 bandwidth equitably. The GRPS accomplishes this by introducing idle times to the network interface ports (P0-P17) 101, 103, 105, 107, 109 so that on average the total port throughput matches the I/O bus 410 capacity.

FIGS. 5A and 5B, when viewed together, provide a simple example illustrating the operation of the GRPS, in accordance with at least one embodiment of the present disclosure. In particular, FIG. 5A shows an exemplary transmit bus 510 connected to two transmit ports (P0 and P1) 520, 530. In order to conserve power and reduce thermal loads, the bus operating capacity has been reduced by 50%, but the port standards require the ports P0, P1 to operate at the full rate when in operation. In order to accommodate the reduced bus capacity, the ports must be de-rated. This de-rating can be accomplished by operating the ports only half time at the required full rate. Since larger data packets require more transmit time than smaller ones, a fair way to implement the 50% capacity reduction is to have each port to stay idle for the same time that it transmits, thereby reducing the average transmission rate of the ports by 50%.

FIG. 5B shows a graph depicting the transmission of three data packets on the two transmit ports of FIG. 5A over time where the bandwidth of each of the two transmit ports is de-rated to a 50% capacity. In particular, FIG. 5B shows how the de-rating can be implemented by counting the number of cycles a port transmits. The vertical axis 530 of FIG. 5B represents cycle counts, and the horizontal axis 540 shows time. The cycle counts increase (denoted by solid lines) while a port is transmitting until the end-of-packet (EOP) (i.e. the end of the data packet) is reached. The counts then decrease while the port remains idle (denoted by dashed lines). To achieve the required 50% de-rating, a port is not allowed to transmit another data packet until its count has reached zero. In this figure, the cycle count during Port 0 transmission 550 increases until its EOP (EON is reached, and then it decreases 555. During Port 0 idle time, Port 1 transmits a packet, and its count 560 increases until the end of its first packet ($EOP_1$) is reached. Then its count 565 decreases. When its count reaches zero, it can transmit a second packet as shown by its count 570 increasing until the end of its second packet ($EOP_2$) is reached. Then, its count decreases 575. Port 1 is allowed to transmit a second packet before Port 0 can because its data packet was smaller in size and required less of the system resources.

FIG. 6 shows a flow chart of the operation of the GRPS as depicted in the example of FIGS. 5A and 5B, in accordance with at least one embodiment of the present disclosure. In this figure, at the start 605, a percentage of the maximum operating frequency for the device is selected 610, and thus a bandwidth of the transmit bus is specified. In one or more embodiments, a user programs the percentage of the maximum operating frequency for the device. In some embodiments, the percentage of the maximum operating frequency may be selected by the user by simply specifying a frequency for operation for the device. In alternative embodiments, the percentage of the maximum operating frequency for the device is predefined and preprogrammed.

After the percentage of the maximum operating frequency for the device is selected, the bit rates for each of the transmit ports is selected 615. In some embodiments, a user programs the bit rates for each of the transmit ports, and in other embodiments, the bit rates for each of the transmit ports are predefined and preprogrammed into the system. Then, the GRPS compares the total bandwidth of the transmit ports to the available bandwidth of the transmit bus 620. If the total bandwidth of the transmit ports is less than or equal to the available bandwidth of the transmit bus, the GRPS transmits at least one data packet on at least one of the transmit ports 625. If a determination is made at 630 that there are no further packets to send, then the process ends 650, and no de-rating of the ports is performed.

However, if the total bandwidth of the transmit ports is greater than the available bandwidth of the transmit bus, the GRPS selects a subset of the transmit ports to use for transmission of at least one data packet 635. After the GRPS has selected a subset of the transmit ports, the GRPS transmits at least one data packet on the subset of the transmit ports for a time x 640, where time x is equal to the time it takes to transmit the data packet(s). After the GRPS has transmitted the data packet(s), the GRPS does not transmit on the subset of the transmit ports for a time y 645, and if there are no further packets to send at 630, then the process ends 650. Time y is a function of time x and the percentage of the maximum operating frequency.

FIGS. 7A and 7B show additional examples illustrating the operation of the GRPS, in accordance with at least one embodiment of the present disclosure. Specifically, FIG. 7A shows a graph depicting the transmission of a data packet over time where the bandwidth of the transmit port for the data packet is de-rated to a 40% capacity. In this figure, the transmit count is shown to increase 710 until it reaches count $C_{on}$ 730, after a time interval of $T_{on}$ 720, which is when the end of packet (EOP) is reached. The to achieve the 40% de-rating capacity, the $C_{off}$ count 735 is set equal to $C_{on}$ 730 added to $C_{on}/2$ 740 (i.e. $C_{off}=3/2\ C_{on}$). Then, the count decreases 715 over the time interval $T_{off}$ 725, during which the port cannot transmit. With a 40% capacity, the idle period 725 (i.e. $T_{off}=3/2\ T_{on}$) is longer than the transmit period $T_{on}$ 720.

FIG. 7B shows a graph depicting the transmission of a data packet over time where the bandwidth of the transmit port for the data packet is de-rated to a 60% capacity. In this figure, the $C_{off}$ count 770 is set equal to $C_{on}$ 775 minus $C_{on}/3$ 780 (i.e. $C_{off}=2/3\ C_{on}$). And, the port idle interval $T_{off}$ 765, which is equal to $2/3\ T_{on}$, is less than the transmit interval $T_{on}$ 760. In general, the idle count $C_{off}=(C_{on}/(\text{de-rating factor}))(1-(\text{de-rating factor}))$, where the de-rating factor is defined as the ratio of the device's capacity at current operating frequency to its capacity at maximum operating frequency. For example, if the device's capacity at maximum operating frequency in N Gbps and its capacity at current operating frequency is 0.4N Gbps, the de-rating factor is (0.4N/N)=0.4, and $C_{off}=(C_{on}/0.4)(1-0.4)=3/2\ C_{on}$. In some embodiments, the system automatically accommodates a plurality (e.g., eight (8)) of different capacity de-ratings.

It should be noted that for the example shown in FIG. 7A, the instantaneous transmit bit rate (nGbps) 786 drops to zero at the EOP, and the resulting average bit rate 784 (0.4 Gbps) is 40% of the instantaneous rate. Similarly, for the example shown in FIG. 7B, the instantaneous transmit bit rate (nGbps) 796 drops to zero at the EOP, and the resulting average bit rate 794 (0.6 Gbps) is 60% of the instantaneous rate.

FIGS. 8A and 8B, when viewed together, provide a detailed example illustrating the operation of the GRPS, in accordance with at least one embodiment of the present disclosure. Specifically, these figures show an example of how the GRPS allocates bandwidth between ports when the system capacity has been reduced to conserve power and limit thermal loading. In particular, FIG. 8A shows an example simplified diagram of the disclosed GRPS 810 scheduling data packets (0-5) from a buffer 805 to transmit ports P1, P2, P3, and P4. In this figure, the data packets (0-5, as indicated by the number located in the lower right-hand corner of each data packet) are waiting for transmission in buffer 805. Each of these data packets is assigned to a 10 Gbps port 820 P1, P2, P3, or P4 (as is denoted in each data packet), and has a specific packet size in bytes (as is denoted in each packet). The GRPS 810 allocates these packets to the ports 820 through a 20 Gbps bus 815 which has a 50% de-rated capacity and, thus, it cannot support all ports simultaneously.

FIG. 8B shows a graph depicting the transmission of the data packets on the transmit ports of FIG. 8A over time where the bandwidth of each of the transmit ports is de-rated to a 50% capacity. Specifically, this figure shows the GRPS packet allocation, where the vertical axis 830 provides the cycle counts for each of the ports as a function of time 835, which is shown on the horizontal axis. Initially, the packet at the head of the buffer, Packet 0 (a 10K byte packet assigned to port P1) is transmitted, and the Port 1 cycle counts 830 increase during transmission of Packet 0, as indicated by line 840. At the end of Packet 0 transmission ($EOP_0$,) 842, the Port 1 cycle counts 830 decrease, as shown by line 844.

Since Port 1 bandwidth is only 10 Gbps, during transmission of Packet 0 through Port 1, the 20 Gbps bus can also support another port and, thus, the next packet in the buffer, Packet 1 (a 5K byte packet assigned to Port 2), is transmitted. The cycle counts 830 of Port 2 increase during the transmission of Packet 1, as indicated by line 850. At the end of Packet 1 transmission ($EOP_1$) 852, the Port 2 cycle counts 830 decrease, as shown by line 854. At the end of Packet 1 transmission ($EOP_1$) 852, 10 Gbps of bus bandwidth is available and, thus, the GRPS can start transmitting another packet.

However, the GRPS must bypass the third packet in the buffer (Packet 2) because it is assigned to Port 1, and Port 1 cannot be used again until its cycle counts (lines 840, 842) go to zero. Therefore, the GRPS starts transmitting the forth packet in the buffer, Packet 3 (a 10K byte packet assigned to port P3), and the Port 3 cycle counts 830 increase during transmission of Packet 3, as indicated by line 860. At the end of Packet 3 transmission ($EOP_3$) 862, the Port 3 cycle counts 830 decrease, as shown by line 864. When Packet 0 completes transmission at (EON 842, additional bus bandwidth becomes available and the GRPS can initiate transmission on a port with zero cycle counts.

The next packet in the buffer, Packet 4 (a 10K byte packet) is assigned to Port 2. Since Port 2 cycle counts have reached zero by this time (line 854), Packet 4 can be transmitted. During transmission of Packet 4, Port 2 cycle counts 830 increase, as indicated by line 870. At the end of Packet 4 transmission ($EOP_4$) 872, the Port 2 cycle counts 830 decrease, as shown by line 874. At the end of Packet 3 transmission ($EOP_3$) 862, bus bandwidth becomes available and, as such, the GRPS can assign another packet for transmission. Therefore, the next packet, Packet 5 (a 8K byte packet assigned to port P4), is transmitted, and the Port 4 cycle counts 830 increase during transmission of Packet 5, as indicated by line 880. At the end of Packet 5 transmission, (EOP$_5$) 882, the Port 4 cycle counts 830 decrease, as shown by line 884.

Finally, at time 872, Port 1 cycle counts (line 844) return to zero, and Packet 2 (a 10K byte packet assigned to port P1) can be transmitted. The Port 1 cycle counts 890 increase during transmission of Packet 2, as indicated by line 890. At the end of Packet 2 transmission (EOP$_2$) 892, the Port 1 cycle counts 830 decrease, as shown by line 894. This completes transmission of the packets in the example buffer. However, it should be noted that in practice, the buffer would be continuously replenished.

Accordingly, embodiments may be realized in hardware, software, or a combination of hardware and software. Embodiments may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Embodiments may also be embedded in and/or controlled by a computer program product, stored on a non-transitory computer-readable storage medium, which comprises all the features enabling the implementation of the methods described herein, and which when loaded in and executed by a particular computer system is able to carry out these methods. Computer program in the present context means any expression, in any language, code or notation, of a set of instructions intended to cause a system having an information processing capability to perform a particular function either directly or after either or both of the following: 1.) conversion to another language, code or notation; 2.) reproduction in a different material form.

Although certain illustrative embodiments and methods have been disclosed herein, it can be apparent from the foregoing disclosure to those skilled in the art that variations and modifications of such embodiments and methods can be made without departing from the true spirit and scope of the embodiments disclosed. Many other examples of embodiments exist, each differing from others in matters of detail only. Accordingly, it is intended that embodiments shall be limited only to the extent required by the appended claims and the rules and principles of applicable law.

I claim:

1. A method for operating a guaranteed rate port scheduler (GRPS) operating in conjunction with a device, the method comprising:
   comparing total bandwidth for a plurality of transmit ports to an available bandwidth of a transmit bus, wherein the transmit bus is connected to the plurality of transmit ports and to the GRPS;
   selecting a subset of the plurality of transmit ports to use for transmission of at least one data packet if the total bandwidth for the plurality of transmit ports is greater than the available bandwidth of the transmit bus;
   de-rating a bandwidth of each of the subset of the transmit ports such that a total bandwidth of the subset of the transmit ports is less than the available bandwidth of the transmit bus; and
   transmitting, by each of the subset of the transmit ports in accordance with its de-rated bandwidth, a portion of the at least one data packet.

2. The method of claim 1, wherein the device is a processor.

3. The method of claim 1, wherein the subset of the transmit ports is one of the plurality of transmit ports.

4. The method of claim 1, wherein the subset of the transmit ports is at least two of the plurality of transmit ports.

5. The method of claim 1, wherein the de-rating the subset of the transmit ports comprises not transmitting on the subset of transmit ports for a time y after a time x, where the time x is equal to a time it takes to transmit the at least one data packet, and wherein the time y is equal to (the time x/(a percentage of a maximum operating frequency of the device/100)) times (1−(the percentage of the maximum operating frequency of the device/100)).

6. The method of claim 5, wherein the percentage of the maximum operating frequency is selected by specifying a frequency for operation of the device.

7. The method of claim 1, wherein the method further comprises selecting bit rates for each of the subset of transmit ports in accordance with its de-rated bandwidth.

8. The method of claim 1, further comprising selecting a percentage of a maximum operating frequency for the device.

9. The method of claim 1, wherein the de-rating comprises introducing idle times to the plurality of transmit ports.

10. The method of claim 9, wherein a throughput of the plurality of transmit ports matches, on average, the available bandwidth of the transmit bus.

11. A system comprising:
    a guaranteed rate port scheduler (GRPS);
    a device to operate in conjunction with the GRPS;
    a plurality of transmit ports; and
    a transmit bus connected to the plurality of transmit ports and the GRPS; wherein the GRPS is configured to:
    compare total bandwidth for the plurality of transmit ports to an available bandwidth of the transmit bus, and if the total bandwidth for the plurality of transmit ports is greater than the available bandwidth of the transmit bus,
    select a subset of the plurality of transmit ports to use for transmission of at least one data packet,
    de-rate a bandwidth of each of the subset of the transmit ports such that a total bandwidth of the subset of the transmit ports is less than the available bandwidth of the transmit bus, and
    transmit, by each of the subset of the transmit ports in accordance with its de-rated bandwidth, a portion of the at least one data packet.

12. The system of claim 11, wherein the device is a processor.

13. The system of claim 11, wherein the subset of the transmit ports is one of the plurality of transmit ports.

14. The system of claim 11, wherein the subset of the transmit ports is at least two of the plurality of transmit ports.

15. The system of claim 11, wherein a time x is equal to a time it takes to transmit the at least one data packet.

16. The system of claim 15, wherein the GRPS does not transmit on the subset of the transmit ports for a time y after the time x, and wherein the time y is a function of the time x and a percentage of the maximum operating frequency for the device.

17. The system of claim 16, wherein the time y is equal to (the time x/(the percentage of the maximum operating frequency/100)) times (1−(the percentage of the maximum operating frequency/100)).

18. The system of claim 11, wherein the percentage of the maximum operating frequency is selected by specifying a frequency for operation of the device.

19. The system of claim 11, wherein the GRPS is further configured to select bit rates for each of the transmit ports, in accordance with its de-rated bandwidth.

* * * * *